UNITED STATES PATENT OFFICE.

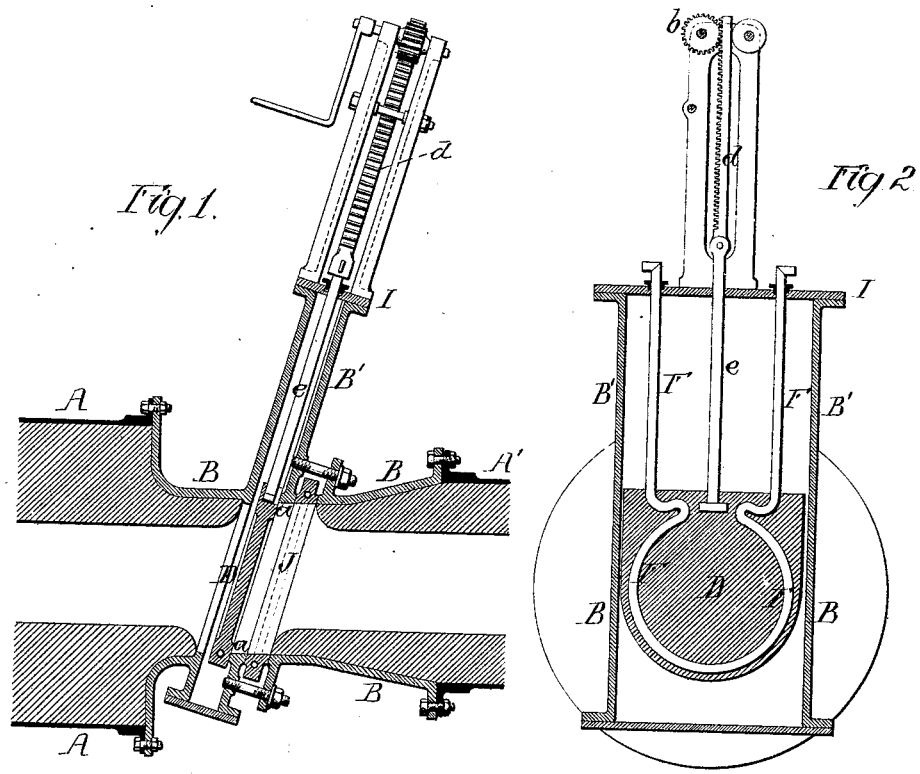

THOMAS WHITWELL, OF STOCKTON-ON-TEES, ENGLAND.

IMPROVEMENT IN VALVES FOR HOT-BLAST PIPES.

Specification forming part of Letters Patent No. 195,861, dated October 2, 1877; application filed June 16, 1877.

*To all whom it may concern:*

Be it known that I, THOMAS WHITWELL, of Stockton-on-Tees, England, have invented a new and useful Improvement in Valves for Hot-Blast Pipes, of which the following is a specification:

The object of my invention is to prevent the leakage of gases in hot-blast or hot-gas pipes, caused by the burning or warping of the valves and valve-seats; and this object I attain in the manner which I will now proceed to describe, reference being had to the accompanying drawings, in which—

Figure 1 is a vertical section of my improved valve for hot-blast pipes; Fig. 2, a transverse section of the same, and Fig. 3 a view of the valve.

A and A' represent portions of a pipe for the passage of heated gases for the use of blast-furnaces, &c.; B, a valve box or casing, and D the valve, the latter being inclined in the present instance, and being adapted to a seat, $a$, formed on the casing B. The pipes A and A' and casing B are provided with the usual lining of fire-brick or similar material.

When the valve D is depressed, as shown in Fig. 1, it prevents the passage of heated gases through the pipe; but it may be raised up into an extension, B', of the casing B, so as to permit the passage of the gases, by operating a pinion, $b$, which gears into a rack, $d$, hung to the upper end of the spindle $e$ of the valve.

This is an ordinary form of valve for hot-blast pipes; but the intense heat to which it is subjected soon causes such a warping or burning of the valve or seat that the bearing-surfaces of the same do not fit together so as to make a tight joint, and a leakage and waste of the gases is the result.

This objection I overcome by forming in the valve, or in the seat adjacent to the bearing-surface of the same, a passage, through which is caused to circulate cold air or water.

In the present instance the valve is combined with a bent pipe, F, which is embedded within the valve adjacent to its bearing-surface, and has extensions passing through openings in the cover I of the extension B' of the casing B. These extensions are connected at the ends to flexible supply and discharge pipes, and are of such a length as to permit the required movements of the valve.

Both the extensions of the pipe F and the stem $e$ of the valve pass through stuffing-boxes at the cover I, in order to prevent leakage of gases at this point.

Between the seat $a$ and the body of the casing B, I insert a detachable ring, J, through which a circulation of air or water is also kept up, and this ring serves to isolate the seat $a$ from the heated body, and thus prevent a high degree of heat from being imparted to the same.

If desired, however, the passages for the circulation of air or water may be formed directly in the seat, and in some cases other portions of the casing B may be provided with these passages.

I claim as my invention—

1. The combination of the valve D and its valve-seat $a$ with the pipe F, embedded in the valve adjacent to the bearing-surface of the valve and seat, as set forth.

2. The combination of the casing B and the valve-seat $a$ with the intermediate ring J and its internal air or water passage, as described.

In testimony whereof I have signed my name to this specification in the presence of two subscribing witnesses.

THOMAS WHITWELL.

Witnesses:
 FREDERICK ROBSON,
 HENRY ROBINSON.